US006546743B1

(12) United States Patent
Sullivan et al.

(10) Patent No.: US 6,546,743 B1
(45) Date of Patent: Apr. 15, 2003

(54) MOBILE COOLING APPARATUS

(76) Inventors: Marcus Ray Sullivan, 2809 Royal Scotts Way, Fort Smith, AR (US) 72908; Gary Alan Hogue, 1101 S. 26th St., Fort Smith, AR (US) 72901

(*) Notice: Subject to any disclaimer, the term of this patent is extended or adjusted under 35 U.S.C. 154(b) by 0 days.

(21) Appl. No.: 10/189,646

(22) Filed: Jul. 2, 2002

(51) Int. Cl.[7] .................................................. F28D 3/00

(52) U.S. Cl. ............................ 62/171; 62/239; 62/304; 62/314

(58) Field of Search ......................... 62/91, 171, 176.4, 62/304, 314, 315, 239

(56) References Cited

U.S. PATENT DOCUMENTS

| | | | | | |
|---|---|---|---|---|---|
| 2,303,867 | A | * | 12/1942 | Stebbins | 62/64 |
| 3,738,621 | A | | 6/1973 | Anderson | 261/29 |
| 3,900,006 | A | | 8/1975 | Shockley, Jr. | 119/18 |
| 3,965,691 | A | | 6/1976 | Van Huis | 62/157 |
| 4,316,464 | A | * | 2/1982 | Peterson | 604/24 |
| 4,342,393 | A | * | 8/1982 | Box | 206/504 |
| 4,454,723 | A | * | 6/1984 | Weasel, Jr. | 62/64 |
| 4,598,555 | A | | 7/1986 | Windecker | 62/91 |
| 4,835,982 | A | | 6/1989 | Ferdows | 62/239 |
| 5,285,654 | A | | 2/1994 | Ferdows | 62/309 |
| 5,309,726 | A | | 5/1994 | Asbridge | 62/91 |
| 5,492,082 | A | | 2/1996 | Krevinghaus et al. | 119/21 |
| 5,692,386 | A | | 12/1997 | Casey, Sr. | 62/176.4 |
| 5,778,687 | A | | 7/1998 | Waldron | 62/78 |
| 6,202,434 | B1 | * | 3/2001 | Hearne, Jr. | 62/304 |
| 6,202,435 | B1 | | 3/2001 | Fujitaka et al. | 62/331 |
| 6,382,141 | B1 | * | 5/2002 | Maynor | 119/843 |
| 6,457,402 | B1 | * | 10/2002 | Parker et al. | 99/475 |

* cited by examiner

*Primary Examiner*—William C. Doerrler
*Assistant Examiner*—Mohammad M. Ali
(74) *Attorney, Agent, or Firm*—Keisling & Pieper PLC; Trent C. Keisling; David B. Pieper

(57) ABSTRACT

A mobile cooling apparatus is provided that may be quickly deployed to cool an area. The apparatus is preferably self-contained or substantially self-contained. The apparatus can be either a dedicated trailer with a conventional draft vehicle or a vehicle itself. The apparatus creates an evaporatively cooled volume of air with fine entrained water droplets suspended therein. The apparatus transfers the cooling suspension to an area to be cooled proximate the apparatus.

20 Claims, 7 Drawing Sheets

MOBILE COOLING APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a mobile cooling apparatus. In particular, the present invention relates to a mobile cooling apparatus that provides a large volume of previously cooled air containing a suspended mist for cooling objects and air in an unenclosed spaced. Known art may be found in U.S. Classes 62 and 261, subclasses 91, 239, 304, 309 and 29 as well as in other classes and subclasses.

2. Description of the Prior Art

As is well known and appreciated by those skilled in the art, water has a high heat of vaporization. This knowledge has been used in the past to cool air using evaporative coolers. The practice has been especially attractive when there is a large quantity of heat involved since it is relatively inexpensive compared to heat exchanging systems such as air conditioning. For situations where ventilation of enclosures is required to maintain the desired air quality, the expense of heat exchangers is usually prohibitively high. This knowledge has also been used to cool objects directly by moistening the outside of the object and allowing evaporation to occur.

The cooling properties of a moving air stream to man and animals are also well known. It has been shown that this cooling property is a result of heat being transported away from the skin more rapidly, i.e. wind chill factor. This process is even faster if the skin is moistened with water that absorbs the heat of vaporization prior to being removed from the skin as a vapor in the moving air stream. For animals that do not perspire, a layer of water to achieve this evaporative cooling must be applied by means other than sweating.

Preventing heat stress in livestock during hot weather is of paramount importance. Animals that get too hot can expire in a very short period of time. In an animals day-to-day activities various precautions are routinely taken to prevent heat stress, i.e. plenty of drinking water, shade, and in confinement areas fans, fixed evaporative coolers, or the like.

In animal production, the animals eventually need to be transported from their growing environment to another locale such as a marketing or processing facility. The transportation step requires that the animals be captured and loaded onto a transport conveyance, often one having special structures for restraining the animals during shipment, and subsequently shipped to the destination. Most modern commercial transport conveyances consist of specially constructed trailers that usually have multiple layers with several individual pens on each layer. Such trailers are typically well ventilated and thus provide adequate cooling when moving at normal highway speeds.

The trip to the destination thus usually provides sufficient cooling from the blowing wind to cool the animals. This is especially true of animals that perspire. However, cooling from blowing wind alone may be inadequate for non-perspirers with thick insulating layers such as hair or feathers if such have gotten too hot during the loading process.

For example, a particularly undesirable condition may easily arise with poultry. Poultry do not perspire and are covered with insulating feathers. When overheated, poultry pant with their mouths open to rapidly exchange air from their lungs. Their natural cooling ability is very poor since they have insulating feathers. Poultry generate heat at about one BTU per hour per pound of body weight. They generate even more heat when they are active, which is the case when they are loaded onto a truck. Although poultry are usually caught and loaded at night since they are less active in lowlight or dark environments, this is also usually a period of very low wind speeds so little cooling to the poultry sitting in cages on the truck will occur from natural winds.

It is obvious that there is a critical time between when the poultry begin to be loaded and the loading is complete when little cooling is occurring. Poultry that are placed in multiple layers of cages on a trailer without adequate ventilation can generate sufficient heat to cause severe heat stress that can lead to death if not timely alleviated. Often times in the past during hot weather, if the loading operation would have to be stopped, the partially loaded truck would have to be driven around to reduce heat stress and prevent death of the poultry.

Culled birds due to heat stress and death (sick or dead animals will not pass USDA inspection) may be quite expensive. Expense is also incurred when the partially loaded or loaded truck has to be driven to cool the birds. Naturally such situations are to be avoided when possible.

Attempts have been made to address cooling problems. Windecker (U.S. Pat. No. 4,598,555) discloses a gas cooler. The gas cooler is used to cool freshly harvested vegetation in refrigeration containers by circulating 25,000 cubic feet of chilled air per minute through the container. In one embodiment, the invention uses a large trailer that may be parked in an abutting end-to-end fashion with a vegetation-containing trailer. Conduits formed by pallets on which boxes of the vegetation are stacked distribute the chilled air, which flows through the produce to the top of the refrigerated container. Air is withdrawn from the top of the container and cooled by flowing it past large chilled water film surface area produced by cascading 2200 gallons of water per minute through a cross-fluted PVC surface media block. A drift eliminator removes water droplets that might damage vegetation or cardboard boxes from the chilled air exiting the surface media block. A radial fan re-circulates the re-chilled air to the conduits below the pallets. A false door is movably mounted to fluidly connect the airflow at appropriate positions in the container. This device is principally adapted for end placement abutting van trailers. It is not adapted for use with flatbed trailers and it is of only marginal relevance to the present invention.

Hearne, Jr. (U.S. Pat. No. 6,202,434 B1) discloses a portable combination hydro cooling and forced refrigerated air-cooling unit. The invention includes a portable cooling trailer for cooling produce at the harvest site, where the produce may be cooled by either forced air refrigeration, where cooled air is drawn through the produce and recycled through a heat exchanger, or hydro cooling, where chilled water is sprayed onto the produce, recaptured and recycled through the heat exchanger. This invention primarily concerns a refigerated trailer and it is of only marginal relevance to the present invention.

Ferdows (U.S. Pat. No. 4,835,982), Ferdows (U.S. Pat. No. 5,285,654), Anderson (U.S. Pat. No. 3,738,621), and Asbridge (U.S. Pat. No. 5,309,726) disclose various types of evaporative coolers. They are of marginal relevance to the present invention in that they deal with individual evaporative units and not a large mobile cooling system.

Van Huis (U.S. Pat. No. 3,965,691), Casey, Sr. (U.S. Pat. No. 5,692,386), Krevinghaus et al. (U.S. Pat. No. 5,492, 082), Waldron (U.S. Pat. No. 5,778,687), and Shockley, Jr. (U.S. Pat. No. 3,900,006) disclose various types of cooling systems for poultry houses or the like. These references are of marginal relevance to the present invention in that they primarily relate to various types of fixed mounted systems for cooling poultry houses or the like.

Thus, a need exists for an improved mobile cooling apparatus such as a self-contained trailer or the like. Such a cooling trailer should be able to cool an area by blowing a cooling stream of misted air to control the local atmosphere surrounding the area. More particularly, such a trailer could be quickly deployed at a remote locale to cool an otherwise inaccessible area.

SUMMARY OF THE INVENTION

The present invention addresses the perceived needs in the art. A mobile cooling apparatus is provided that may be quickly deployed to cool an area. The apparatus is preferably self-contained or substantially self-contained. The apparatus can be either a dedicated trailer with a conventional draft vehicle or a vehicle itself.

In accordance with one exemplary embodiment of the present invention, a mobile cooling apparatus that is adapted to cool an area is provided. The area may be populated by animals, such as poultry undergoing a loading operation. Further, since such loadings only occur occasionally for any given locale, the expense of a fixed cooling unit for each such locale would be prohibitive. As a result, the cooling apparatus needs to be mobile so that it can be moved and used during hot weather on the days it is needed.

For example, poultry loading operations often occur at remote poultry farms without sufficient facilities to provide adequate electricity or water for a permanent cooling apparatus of the capacity required. Consequently, a mobile cooling apparatus that is self-contained is highly desirable to insure timely operation and reliability. Since poultry farms have water available in quantities sufficient for watering purposes, the farm can often provide a portion of the water needed for the mobile cooling apparatus by using a simple garden hose to couple the system to the farm's water distribution system.

While many vehicular configurations are possible for the present invention, in one exemplary embodiment, a van type trailer is adapted to be used as a mobile cooling trailer. The weight of such a trailer when all supplies and equipment are loaded will usually be in excess of thirty thousand pounds. In addition to weight requirements, the spatial dimension for the requisite length and height needed for formation and subsequent distribution of the suspended cooling air mist is large, especially when the area to be cooled is as large as a conventional flatbed trailer adapted to transport poultry. Such a width dimension permits a mixing chamber for advantageously mixing fine water droplets with an incoming air stream. This mixing allows for evaporative cooling of the air stream as well as ensuring that the mist and air are uniformly mixed and a desirable suspension formed prior to deployment onto the area to be cooled, especially when such is poultry loaded on a nearby trailer.

In the exemplary embodiment, a large (over 30 feet long) van or enclosed trailer is transformed into a mobile cooling apparatus by installing a battery of fans that blow air outwardly upon one side and installing a grid of misting nozzles on the other side and installing a water tank, an electric generator, a high-pressure water pump and necessary structural adaptations to accommodate these components.

At the beginning of a poultry loading operation, the cooling trailer is deployed proximate the transport trailer so that the transport trailer can easily be cooled thereby. A water supply hose between the farm's water distribution system and the water storage tank on the mobile cooling trailer is connected and turned on.

The battery of fans pull air transversely through the mobile cooling trailer's body to generate a cooling air stream with a suspension of water droplets. The grid of misting nozzles provides the water droplets or mist. The droplet size is such that the droplets are readily suspended in the air. The interior of the trailer body between the fan battery and the mixing nozzles defines a plenum that serves as a mixing and evaporating chamber. The air is first cooled evaporatively by partial evaporation of the misted water droplets. The excess water droplets are suspended and carried by the evaporatively cooled air stream to provide additional absorption of heat to the poultry on the transport trailer alongside.

The cooled air-mist suspension stream exits the mobile cooling trailer and it is forcefully directed upon the transport trailer with sufficient velocity to surround and penetrate it. This results in the advection of heat from within the transport trailer. This heat could arise from biological respiration of the poultry and the loading of hot cages, etc. onto the truck. There is sufficient air exchange to maintain the air surrounding and in contact with the transport trailer's load at the temperature of the cooling air-mist stream. Additionally, part of the suspended mist will be deposited on the poultry and when this water evaporates cooling is accelerated. This fine water mist in the air is actually inhaled by the poultry and can absorb heat internally providing enhanced body-core cooling. Thus, poultry are rapidly cooled as they are loaded by being subjected to cool air, a moving air stream, small water droplets in respired air, and water being deposited on and vaporizing from their bodies.

An added benefit is obtained from the water deposited on the poultry when the transport trailer leaves the farm in route to the processing plant. This benefit is the cooling, especially when the transport trailer is initially traveling at low speeds, from the evaporation of the deposited water on the poultry bodies while they are enroute to the processing plant.

Thus, a principal object of the present invention is to provide a mobile cooling apparatus for cooling an area.

Another object of the present invention is to provide a mobile cooling apparatus that is substantially self-contained.

Yet another object of the present invention is to provide a mechanism for cooling animals such as poultry on the initial part of their journey from the farm to the processing plant.

Another object of the present invention is to provide a geometrical configuration that defines a plenum wherein water droplets are mixed with air and vaporized to both evaporatively cool the air and to form a cooling suspension therewith.

Another object of the present invention is to provide cooling of objects while they are being loaded upon a proximate transport conveyance by blowing a cooled stream having suspended water droplets onto the objects during the loading operations.

A further object of the present invention is to cool animals being loaded onto a transport trailer with a combination of cooled air, a moving air stream, small water droplets in respired air that can absorb heats of vaporization internally, and water being deposited on and vaporizing from their bodies.

Yet another more basic object of the present invention is to provide cooling in remote locales.

These and other objects and advantages of the present invention, along with features of novelty appurtenant thereto, will appear or become apparent in the course of the descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
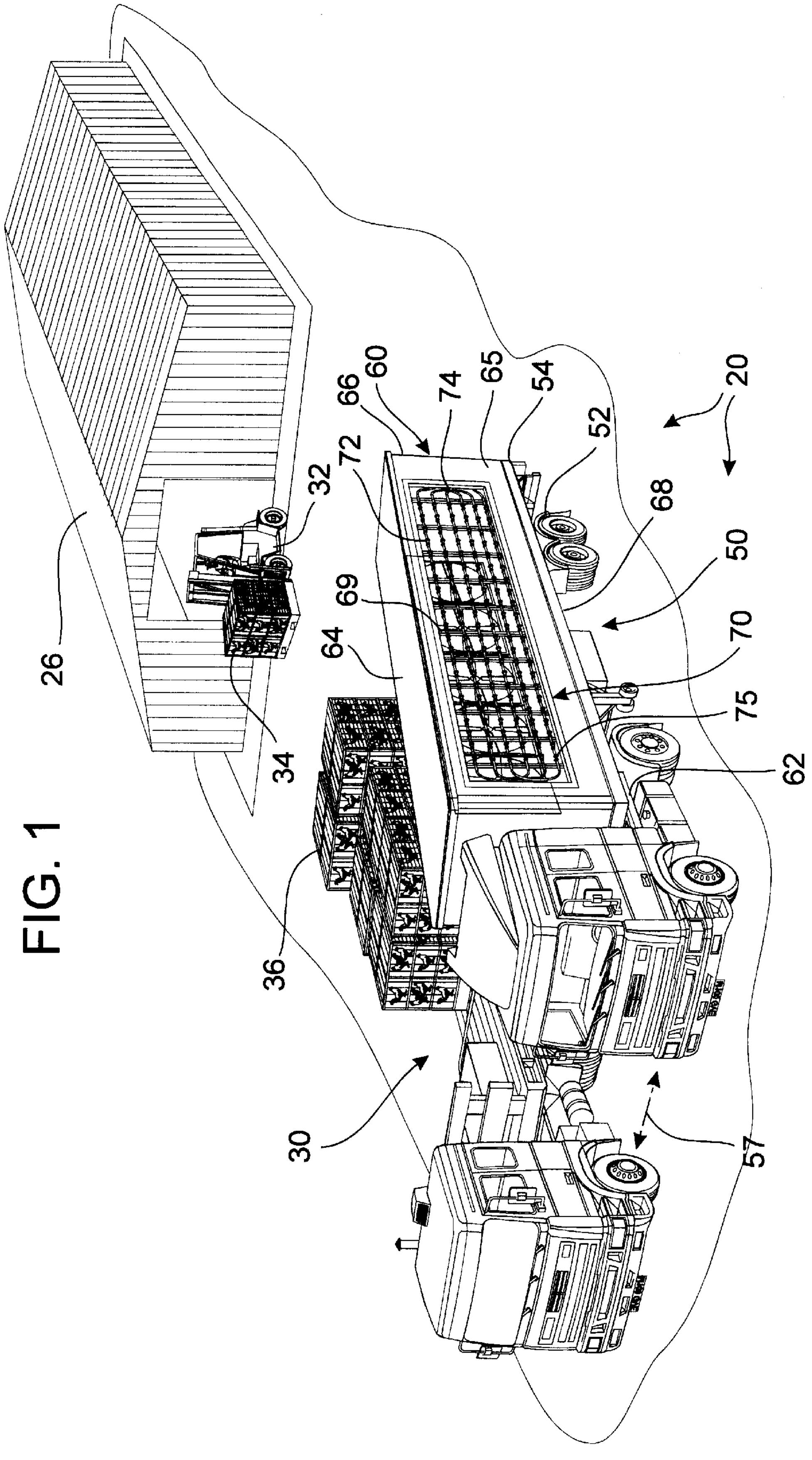
FIG. 1 is an environmental view of an exemplary embodiment in accordance with the present invention taken generally from the front.
Figure 2:
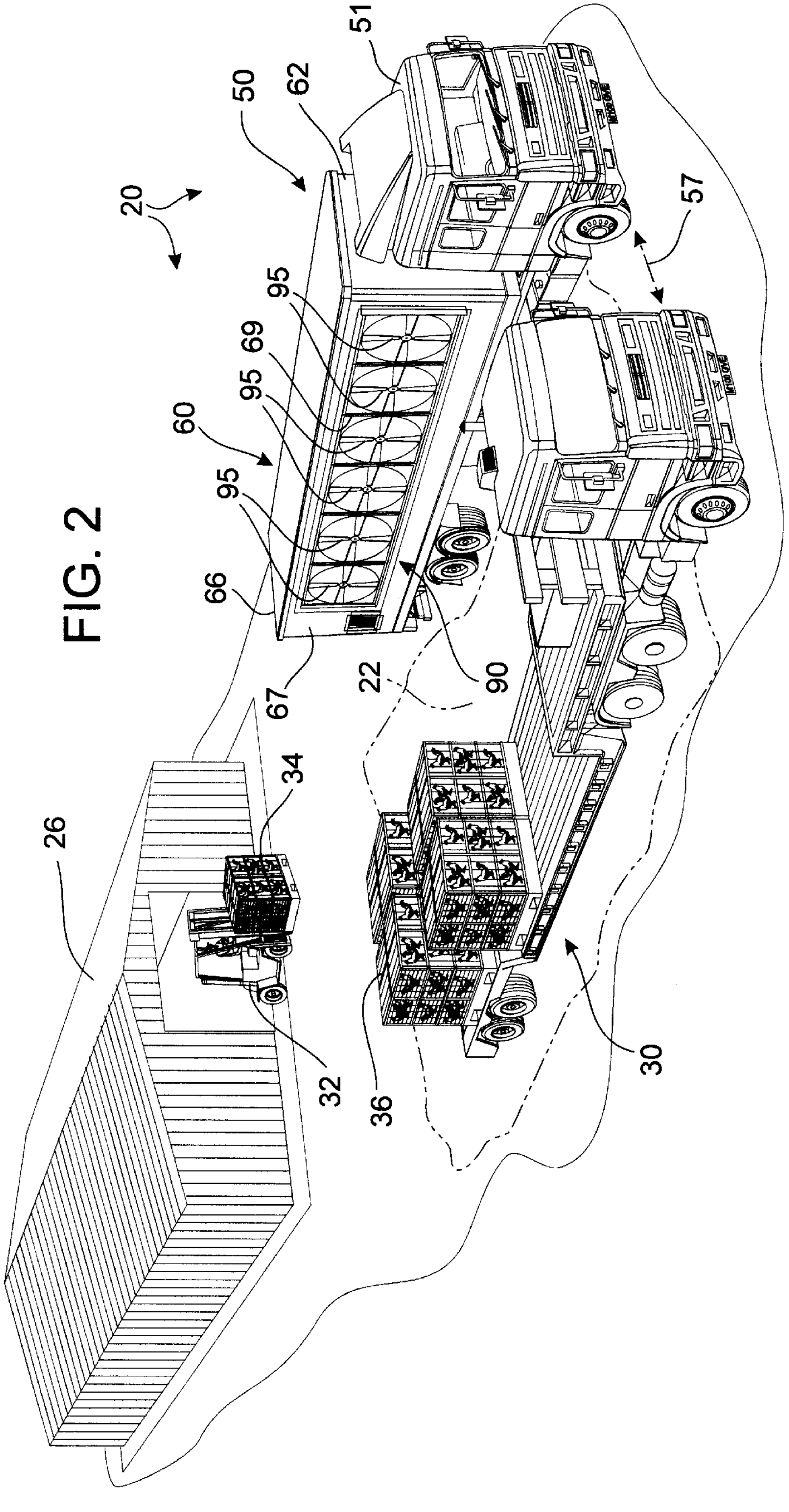
FIG. 2 is an environmental view taken generally from the opposite side of FIG. 1 thereof.

An exemplary embodiment in accordance with the present invention is generally designated by reference numeral 20 in FIGS. 1–10. The invention 20 may be deployed to cool an area 22 proximate the invention by forcefully directing evaporatively cooled air with entrained water droplets suspended therein upon area 22.

In one particular exemplary embodiment, the invention is deployed as a mobile cooling trailer 50 pulled by a conventional draft vehicle 51. Trailer 50 is adapted to cool a proximate transport trailer 30 during a poultry loading operation. Such a loading operation typically occurs at a remote commercial poultry farm when the poultry is ready to be transported to another location, usually a processing plant. At such a locale, there will be a poultry house 26 containing poultry to be caught and caged, a poultry transport trailer 30, a loader with fork lifts 32 for moving empty tiers of cages from the transport trailer to the poultry house and loaded tiers of cages 34 back to the transport trailer. These locations are characterized by being remote rural settings with limited water and electricity availability during the catching and loading operation. Since catching and loading operation usually occurs at night, the mobile cooling trailer 50 can include a self-contained lighting system to enable its operators to make operational adjustments as needed and to inspect the mobile cooling trailer 50 for operational problems if such is desired.

The trailer 50 also can be deployed in other remote locations. For example, a transport trailer 30 occasionally encounters problems after loading, such as flat tires or other emergency road problems. This is a serious situation in hot weather as the entire load of poultry is at peril. The mobile cooling trailer 50 can be quickly deployed to cool these stranded transport trailers 30 to cool the poultry until repairs to the transport trailer 30 are completed. In this manner, the costly risk of breakdowns of loaded transport trailers 30 is ameliorated.

The mobile evaporative cooling trailer 50 may be advantageously adapted from a conventional van type trailer that usually has wheels 52 supporting a rigid chassis or frame 54 supporting a hollow, generally parallelepiped shell or housing 60.

The original box van housing 60 includes several structural components that may be left unmodified during installation of equipment and conversion into a mobile cooling trailer 50. Such components include the front end 62, the top or roof 64, the rear end 66 (usually with doors), the bottom 68 and portions of the sides 65, 67. The front end 62, top 64, rear end 66 and bottom 68 are typically substantially impermeable to fluid flow therethrough.

The left side 65 of the mobile cooling trailer 50 has been modified by opening a substantial portion to render it substantially permeable to fluid flow. The side 65 has a grid 70 of pipes with a plurality of emitters or misters or misting nozzles 75 thereon. The grid 70 routes and supplies water to the emitters through several water lines 72. The individual water lines 72 in the grid 70 are attached to a series of exposed vertical structural support members 69, which may be already present or added to the trailer.

The right side 67 of the mobile cooling trailer 50 has been modified similarly to the left side 65. The right side 67 has a series or bank of fans 90 attached thereto. The bank of fans 90 draw air through the housing 60. Thus, housing 60 acts as a plenum 80. When deployed, the bank of fans 90 blow an air-mist suspension 85 that is created in phlenum 80 forcefully outward toward the transport trailer 30 with sufficient velocity to reach a distance of 150 feet. As a result, the distance 57 between the mobile cooling trailer 50 and the transport trailer 30 can vary substantially but the cooling effect on the cooled area 22 including the poultry and the transport trailer 30 will still be within acceptable operating parameters.

Vertical support members 69 comprised of remnants of the box van sidewalls on both the left and right sides 65,67 provide convenient attachment points. On the right side 67, the members 69 separate the fans 95. The vertical support members 69 are necessary to provide stability for transport over roads at highway speeds and over bumpy rough secondary or farm roads surfaced with gravel or dirt. They also serve to restrict airflow entry into the mobile cooling trailer to be through the mist-grid system 70 on the opposite side 65. More structural support structures for the fans 95 will be discussed in detail in subsequent sections.

Figure 3:
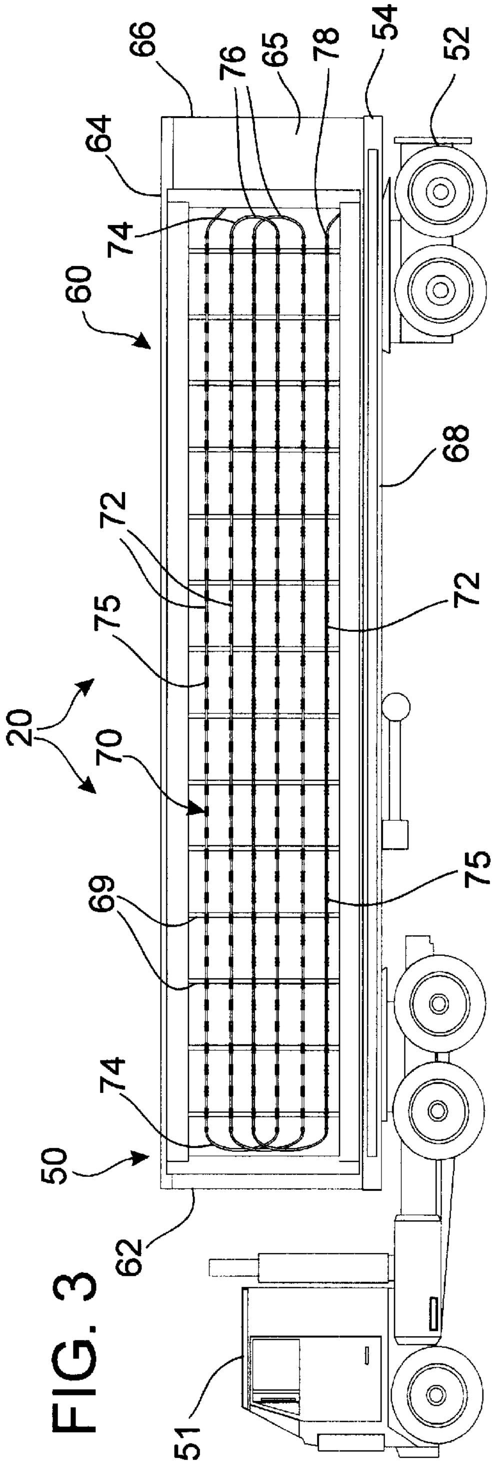
FIG. 3 is an elevational view taken generally from the right side thereof.

The detail of the water distribution grid 70 and location of misting nozzles 75 is best seen in FIG. 3. The piping 72 is attached to vertical supports 69 that serve to maintain the geometrical configuration of grid. We have found that ⅛ inch steel spaced between 2½ feet and 4 feet apart are sufficient. A metal or PVC pipe with ½ inch id has been found to work well. Those skilled in the art will appreciate that these pipes must be sized such that the loss in hydraulic head from the first misting nozzle to the last misting nozzle will be within the required operating range of the nozzles. The pipes are attached to the vertical support members with a clamp or u-bolts and are spaced * apart. There are six equidistantly spaced lines 72 that run horizontally from adjacent the front to adjacent the rear of the trailer. Misting nozzles 75 are located approximately 10–12 inches along each line 72. Each nozzle 75 emits fine water droplets 77 proximate side 65** when in use.

Water is supplied via a flexible hose at the rear end of the uppermost misting line first. Water is routed from the front end of the uppermost misting line to the front end of the next line from the top by a coupling line 74. As water exits the rear of this line it is routed to the rear of the next line by another coupling line 74. As water exits the front of this line it is routed to the front of the next line by another coupling line 74. As water exits the rear of this line it is routed to the rear of the next line by another coupling line 74. As water exits the front of this line it is routed to the front of the next line by another coupling line 74. The rear ends of all lines have a shut off valve 76 to control water flow. These valves can be opened in the desired combination to control the number of lines misting at any one time as well as their geometry. The preferred partial operation is combinations of the top line and the line fourth from the top. If more misting is needed the second line from the top and the fifth line from the top can be added. Maximum misting occurs by adding the remaining two lines. The valve 78 at the rear end of the lowermost line may be advantageously used as a clean out.

To inspect the cooling trailer during operation and have access for an operator to enter without opening the outside doors, a space may be left between the mist distribution system 70 and the rear of the mobile cooling trailer 50. An operator can easily access the inside of the trailer through such an aperture. A short ladder is also helpful in assisting the operator to gain entry into the mobile cooling trailer bed.

Figure 4:
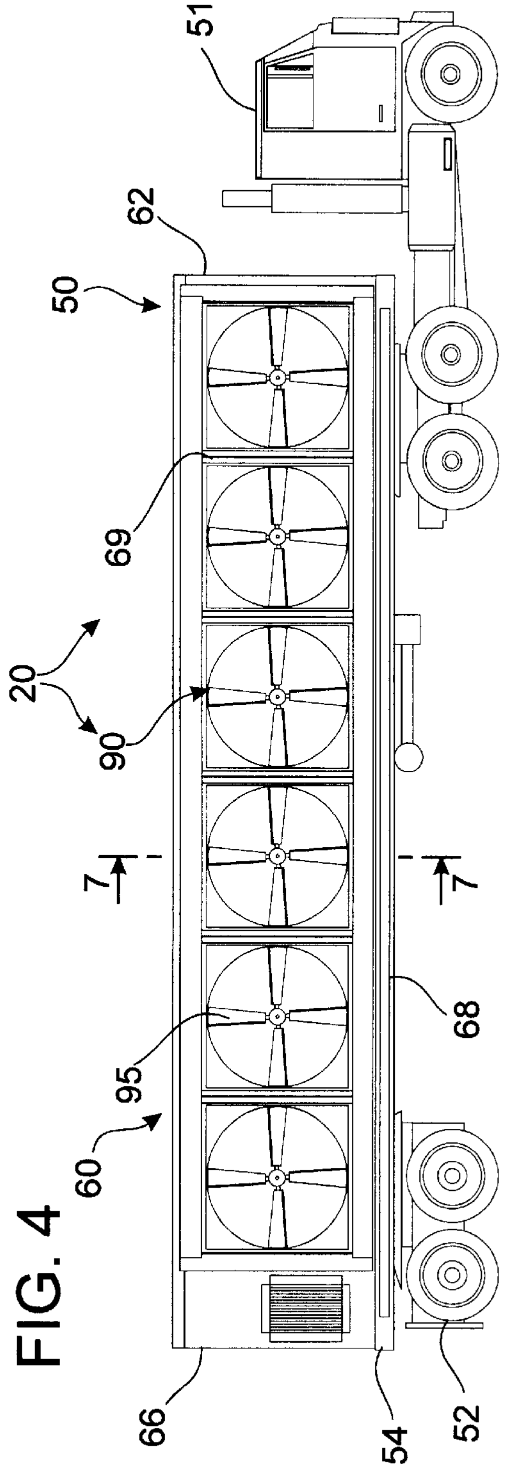
FIG. 4 is an elevational view taken generally from the left side thereof.

The geometrical layout of the fans may best be seen in FIG. 4. There are a total of six fans in bank equidistantly spaced along the right side of the mobile cooling trailer 50. The forward most fan 95 in the front is located 4½ feet from the trailer front 62. The fans 95 have 21 inch spacing between one another. We have found this spacing to be close enough to give complete coverage of the transport trailer 30. The fans 95 are located 33 feet above the trailer floor 68.

Figure 5:
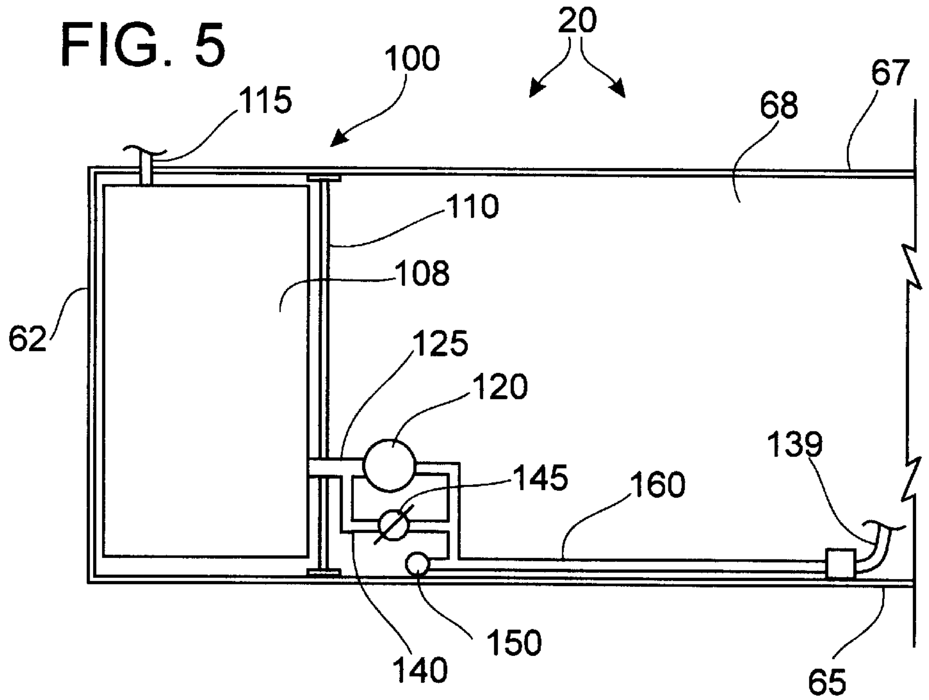
FIG. 5 is a top plan view taken generally from the front thereof with portions fragmented or broken away for clarity.

The mobile cooling trailer 50 is essentially self-contained and as a result needs the capacity to carry sufficient water for its operation during poultry loading operations. FIG. 5 best shows the water supply and routing system 100 components and their arrangement for transport and operation.

A low profile water tank 105 has baffles that are necessary for its transport when partially full to prevent it from being destroyed or shifted in position by the inertial force of the water hitting the tank sidewalls during sudden motion changes. The tank is further stabilized for transport using a stabilizer bar 110 against the rear of the tank to keep it from moving backward away from the front of the trailer 50. We have found a tank capacity of 500 gallons is sufficient to meet the water needs as this can be augmented during loading operation using a simple garden hose connected to the farm's water supply and the tank inlet 115.

The tank water is gravity fed from the water tank 105 to the pump 120 through line 125. To control operational water pressure, a simple by-pass 140 is connected to the outlet pipe 128 at tee 130. The valve 145 is used to adjust the volume of water returned so that the proper operational pressure will be maintained. This operational pressure is monitored with pressure gauge 150. The pipes are rigid or high-pressure hoses and are attached to corner 160 between the trailer floor 68 and the sidewall on left side 65. The last section 139 is made of flexible hose and connects to the misting grid 70.

The misting nozzles 75, require an operational pressure range between 160 and 180 psi as well as the delivery of a sufficient volume of water, approximately 6.7 gallons per minute, to exceed that delivered by the maximum number of misting nozzles in operation. This water pressure is critical as it controls the size of droplets 76 as well as the number of droplets each nozzle will produce. This pressure range and delivery volume is provided by the pump 120. We have found that a pump that delivers 7 gallons per minute at pressures ranging from 160 to 180 psi is suitable.

Figure 6:
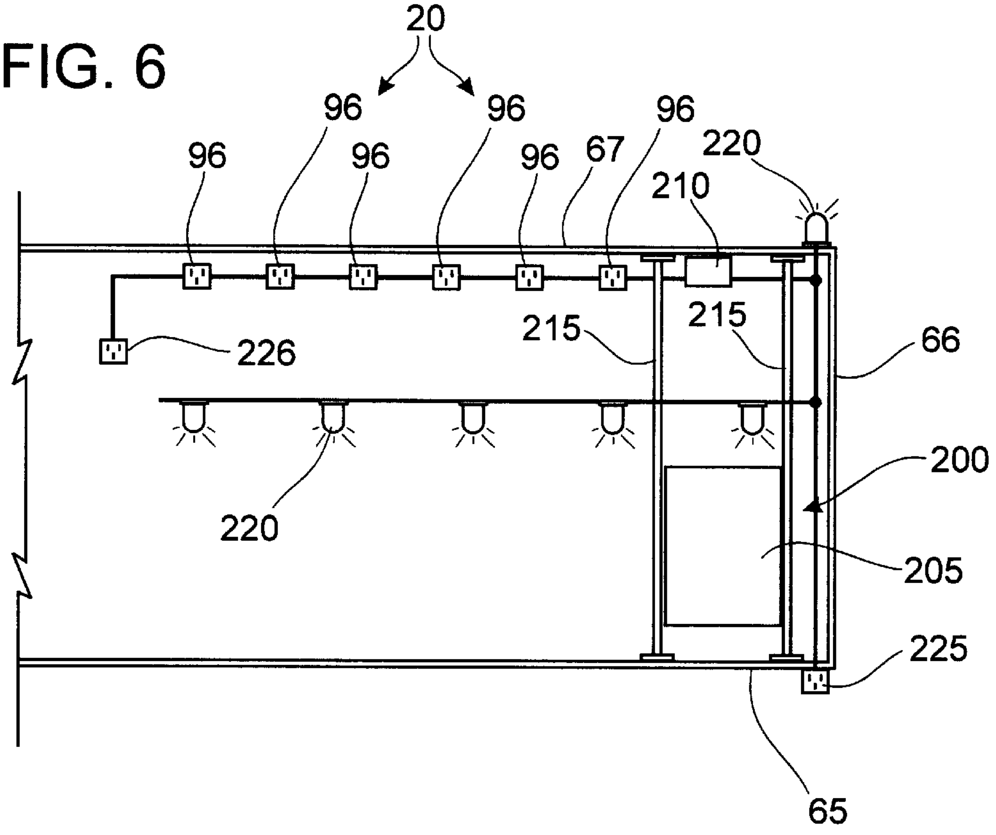
FIG. 6 is a top plan view taken generally from the rear thereof with portions fragmented or broken away for clarity.

The electrical system of the mobile cooling trailer is best seen in FIG. 6. Since augmentation of the electricity supply is usually not practical at remote sites, the mobile cooling trailer 50 includes a power generation system 200. System 200 has an electrical generator 205 to provide electrical power to fans 95, any associated lights, water pump 120, and outside electrical connectors 220. An electrical generator 205 with a generating capacity of 40 kilowatts electrical has been found to be adequate for this job. The electric generator 205 has the capability of providing 110 or 220 volt AC. The generator 205 is stabilized to prevent shifting during transport using cargo-stabilizing bars 215. A master switch and circuit breaker or fuse box 210 is located between the generator 205 and all electric circuits.

A system of conduits and cords are used to route the electricity from the point of generation to the consumption sites. Lights 220, 225 both inside and outside of the mobile cooling trailer may be installed as necessary so that the operation of the trailer can be monitored and adjusted at night. Electrical plugs 96 are provided for connecting the fans to the electricity. Either lights or auxiliary equipment can be connected at outside electrical plugs. The water pump is plugged to outlet 225.

A diesel engine powers the on-board electrical generator 205. Special considerations and precautions are necessary for fuel storage and engine exhausts. The fuel must be stored in a well ventilated area to avoid the possibility of vapors accumulating to the point of creating an explosion hazard. Under sustained operation, the engine exhaust mufflers and piping is usually between 400 and 500 degrees Fahrenheit. Thus it needs to be shielded to prevent accidental burns to operators. The exhaust gases contain a high level of poisonous gases and are vented to the outside of the mobile cooling trailer using a flexible metal tubing and directed away from the air-mist stream that is blown onto the transport trailer 30.

Figure 7:
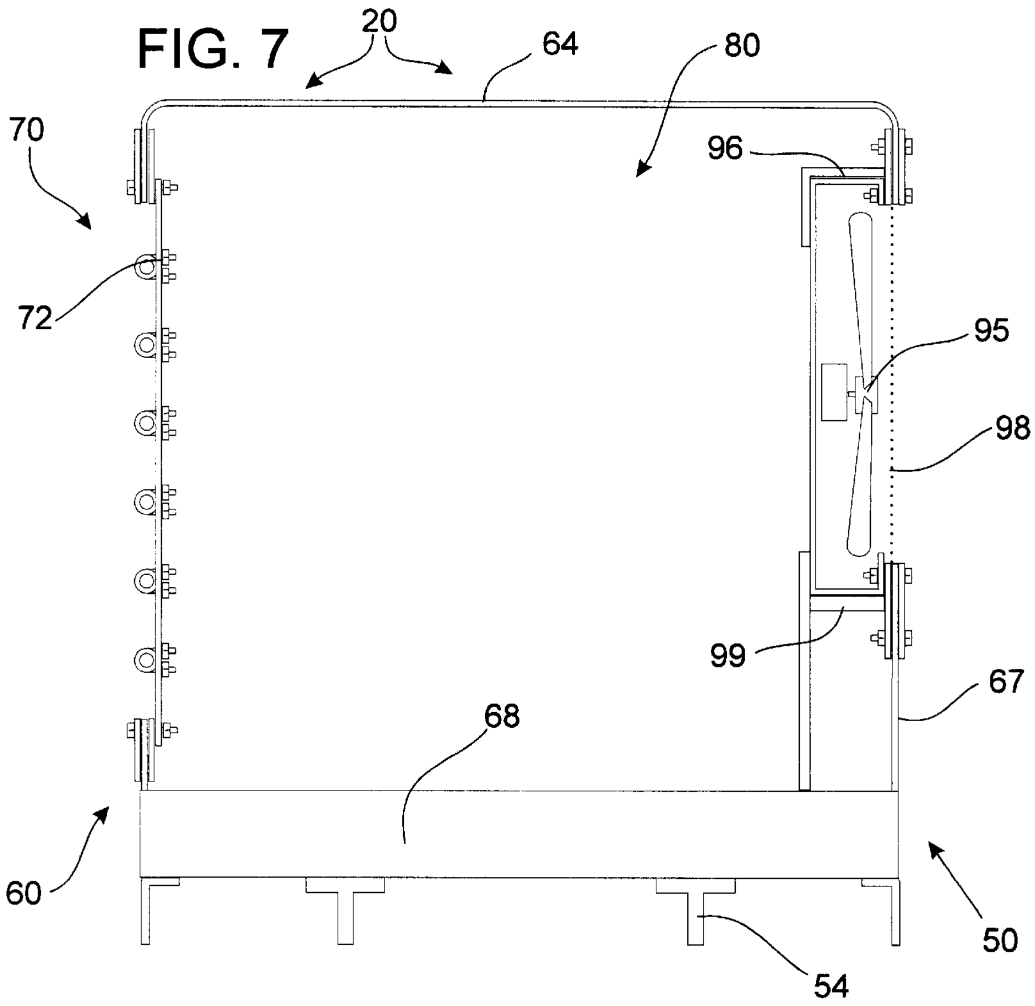
FIG. 7 is a cross-sectional view thereof taken generally along line 7—7 of FIG. 4.

A cross-sectional view of the mobile cooling trailer is shown in FIG. 7. The trailer chassis 54 supports the entire trailer housing 60. The floor 68 functions as the bottom of the plenum chamber 80 and for attaching equipment to prevent load shifting during transport operations. The sides 65, 67 serve to restrict airflow and as anchors for vertical support members 69, electrical conduit 225, water piping 128 for horizontal load stabilizing bars, and for fan frames 96.

The fans are attached with bolts spaced around the perimeter of the fan frames 96. The bolts have large washers for increasing the resistance of the sidewalls to the bolt heads tearing out. The protective screen 98 composed of one half inch hardware cloth is attached between the fan frame 96 and the trailer sidewall 67. An iron frame 99 supports each fan. The iron frame is constructed of ¼ inch angle iron which we have found to be suitable for this purpose. The iron frame may have legs beneath each corner of the fan frame 96. The legs next to the trailer sidewall 67 are attached to the sidewall to provide stability during operation as well as transport.

Figure 9:
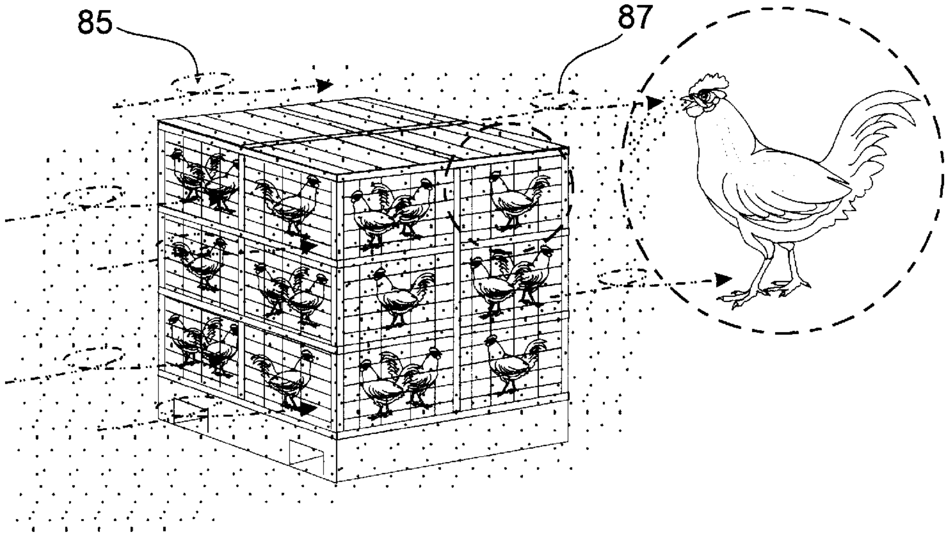
FIG. 9 is a second environmental view showing an animal container with the encircled portion more specifically depicting the cooling mechanism in accordance with the present invention when deployed to mist poultry; and, FIG. 10 is a diagrammatic view depicting fluid flows associated with an exemplary embodiment in accordance with the present invention.
Figure 8:
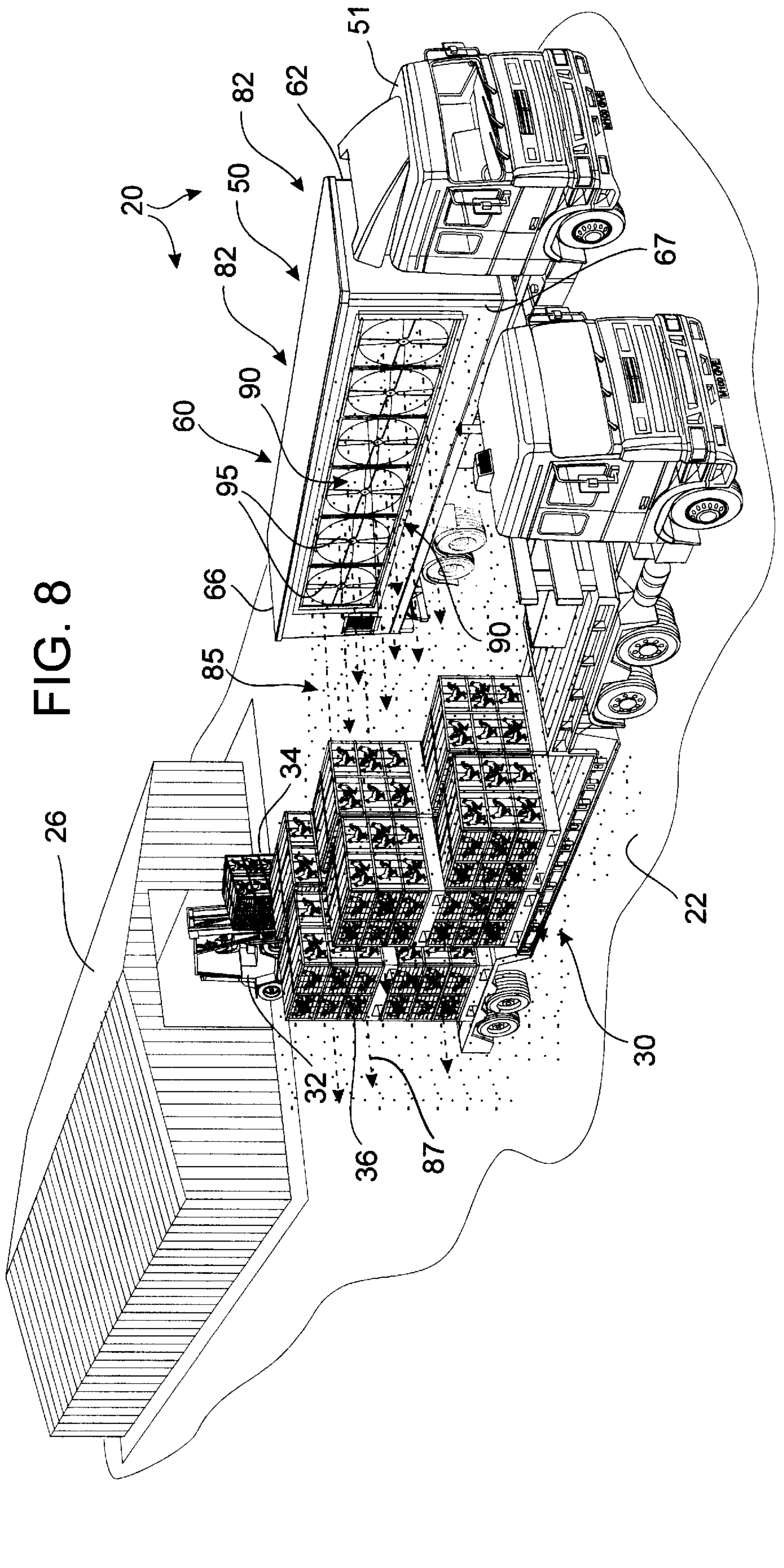
FIG. 8 is an environmental view showing an exemplary embodiment in accordance with the present invention deployed to mist poultry.
Figure 10:
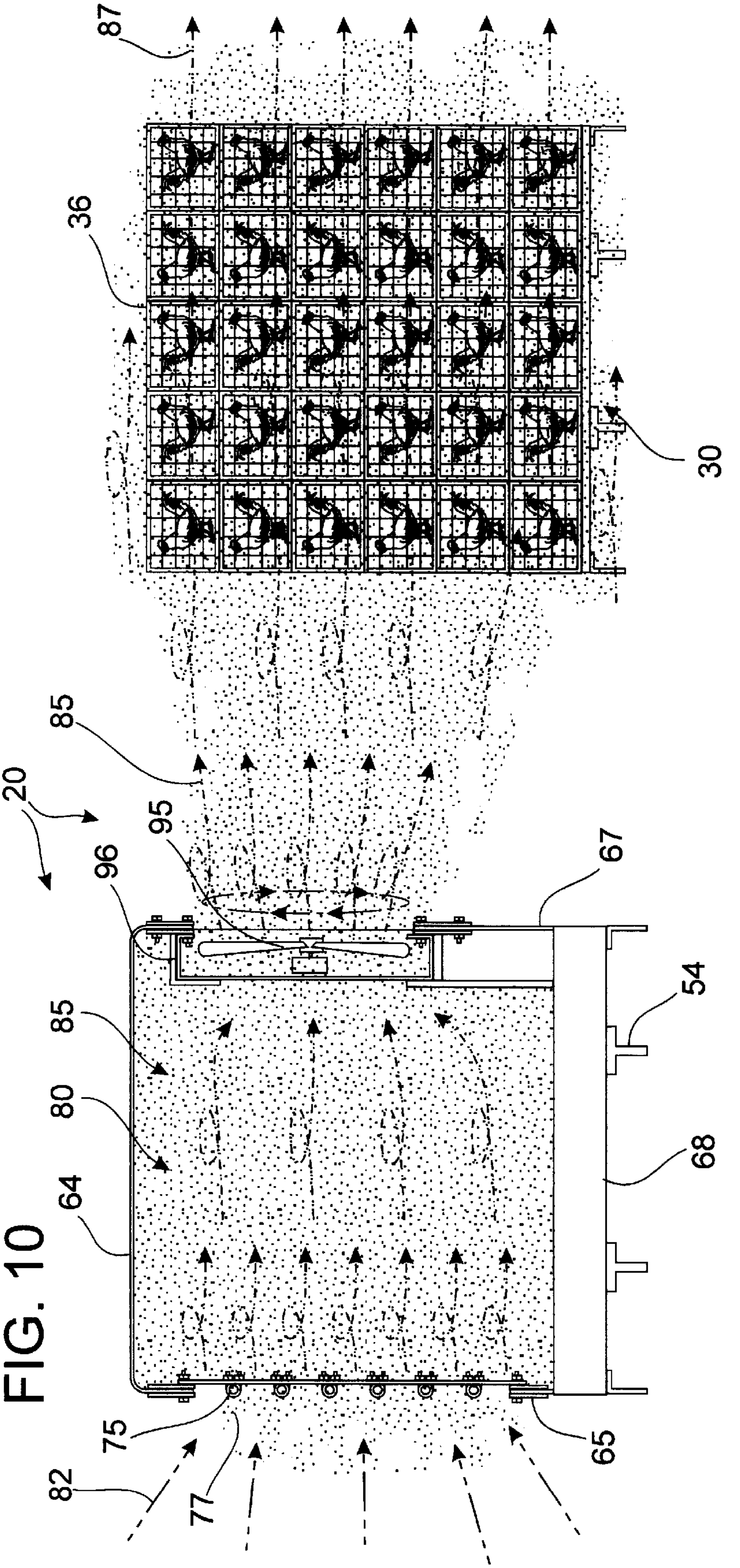

The distribution of the cooling mist-air stream may be best seen in FIGS. 8–10. The air stream leaving the mobile cooling trailer 50 impacts the transport trailer 30 along its entire length. The partial obstruction created by the tiered cages 36 and poultry results in the splitting of the air stream 85 to travel around the transport trailer as well as through the transport trailer's cargo. This envelope of suspended water droplets in turbulent air 85 has a temperature as much as 20 degrees Fahrenheit lower than the ambient air temperature even after it has reached the downwind side of the transport trailer 30. The exact temperature lowering depends on several factors with the two main ones being the relative humidity and the ambient air temperature.

The cooled air-mist suspension 85 is forced through the cages as shown in FIG. 9. The speed of the cooled air-mist suspension as well as the partial obstruction of the tiers 36 causes a swirling action that penetrates the remotest corners and crevasses of the tiers. The panting poultry actually breath the microscopic droplets into their lungs where they evaporate and absorb heat internally thus cooling the poultry at the core. The suspended water droplets 76 will be deposited on the feathers and be subsequently evaporated on the way to their final destination thus providing some cooling after the transport trailer is removed from the cooling envelope of the mobile cooling trailer.

FIG. 10 is a cross sectional view showing fluid flow streamlines 300. As is readily apparent, turbulent air enters phlenum 80 past the misting nozzles 75 into the mobile cooling trailer shell 60. The mobile cooling trailer shell 60 acts as a plenum chamber 80 by enabling a uniform mixing of the air and mist into a suspension 85. This suspension 85 is then forcibly ejected by fans 95 toward the transport trailer 30. The transport trailer 30 is commonly totally engulfed in the air-mist suspension 85. The air pressure created by the fans 95 blowing directly 10 on the transport trailer 30 is such that appreciable quantities of the suspension 85 are forced though the tiers of caged poultry. The air 87 emerging from the caged poultry on the downwind side of the transport trailer is 12 to 20 degrees Fahrenheit below ambient air temperature.

The ambient air temperature and relative humidity are simultaneously changed during operation of the mobile cooling apparatus. Sufficient water vaporizes from the droplets to raise the relative humidity to 100%. The heat of vaporization is absorbed from the air thus lowering the air temperature. Since the maximum amount of water vapor that air can contain is a function of temperature, as the air temperature is lowered the maximum amount of water vapor the air can hold is lowered simultaneously. This vaporization and temperature lowering continues until the water vapor content of the air reaches the maximum the air can contain at its temperature or 100% relative humidity.

For water to vaporize, water molecules escape from a liquid surface to the gaseous phase. During the transition from liquid to gas, the water molecules absorb the heat of vaporization. The process of heat absorption form a gas by a liquid is a function of the liquids surface area and its geometric distance from the gas. The closer a given volume of air is to the surface of water the faster heat is transferred between air and water. Thus, it is desirable to maximize surface area to maximize the heat transfer potential. For example, if we take a volume of water approximately equal to one-half cup in a solid cup, it has a liquid surface to air contact area of about 40 $cm^2$. However, if this water is broken up into small cubes of 0.5 microns on a side (it is actually broken into smaller diameter spheres by the emitters) which would further magnify these calculations then the surface area will be increased approximately 500,000 times.

In addition to increasing the water surface area, the water droplets are mixed throughout the volume of air to be cooled. This distribution will reduce the average distance between the water surface and the adjacent air by the same level of magnitude. The contact between air and the water surface will be promoted about the same degree. Subsequently the vaporization of water under these conditions will be very rapid. Only a few seconds will be needed for the air to reach 100% relative humidity.

The 100% relative humidity-cooled air stream still contains water droplets that were not vaporized and thus forms a suspension. The cooled air water droplet suspension is blown onto the area to be cooled, such as a poultry transport trailer. These water droplets and cooled air begin to absorb heat when they contact anything on the transport trailer that has a higher temperature than the cooled air water suspension stream. Any temperature rise in the cooled air increases its maximum capacity to hold water vapor that it can contain and this results in more water being vaporized from the included water droplets until the relative humidity of the cooled air stream is again at 100% relative humidity. This subsequent water vaporization is accompanied by the absorption of the heat of vaporization and the loss of such heat in the area being cooled.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A mobile trailer adapted to cool an area proximate thereto, said trailer comprising:

a wheeled carriage supporting a phlenum having a plurality of substantially impermeable sides and at least two substantially permeable sides bounding an internal mixing chamber;

a plurality of misters proximate one of said substantially permeable sides, each of said misters adapted to selectively emit fine droplets of water and means for selectively supplying and routing water to each of said misters for subsequent emission therefrom proximate said mixing chamber; and, a plurality of fans located oppositely from said plurality of misters on said other permeable side, said fans adapted to selectively create a turbulent airflow to move said emitted water droplets into said phlenum and through said phlenum to form a suspension and to expel said suspension exteriorly to thereby cool the area proximate said trailer.

2. The trailer as recited in claim 1 further comprising power generation means for supplying power to selectively operate said fans and to operate said means for selectively supplying and routing water.

3. The trailer as recited in claim 2 wherein said power generation means comprises an internal combustion motor driving an associated electrical generator and further comprising control means associated therewith to selectively route generated electrical power to said fans and said water supply means.

4. The trailer as recited in claim 1 wherein said plurality of misters comprises a plurality of rows and wherein each of said rows comprises a plurality of individual misters linked by a water supply pipeline and wherein each of said rows is linked by a water supply pipeline.

5. The trailer as recited in claim 4 wherein each of said rows may be selectively manipulated to restrict the flow of water thereto.

6. The trailer as recited in claim 1 wherein said wheeled carriage comprises a hollow parallelepiped housing with substantially impermeable top and spaced apart bottom and spaced apart ends with substantially permeable spaced apart sides.

7. The trailer as recited in claim 6 wherein each of said substantially permeable sides includes a framework of exposed reinforcing members.

8. The trailer as recited in claim 7 wherein said plurality of misters are secured to said framework along one of said substantially permeable sides and said plurality of fans is secured to said framework along the other of said substantially permeable sides.

9. A mobile trailer adapted to cool a proximate area, said trailer comprising:

a wheeled carriage supporting a phlenum having a plurality of substantially impermeable sides and at least two substantially permeable sides bounding an internal mixing chamber;

a plurality of misters proximate one of said substantially permeable sides, each of said misters adapted to selectively emit fine droplets of water into said phlenum and means for selectively supplying and routing water to each of said misters for subsequent emission therefrom;

a plurality of fans located oppositely from said plurality of misters on said other permeable side, said fans adapted to selectively create a turbulent airflow to move said emitted water droplets from interiorly of said phlenum exteriorly of said phlenum to thereby cool the area proximate; and, power generation means for supplying power to selectively operate said fans and to operate said means for supplying and routing water.

10. The trailer as recited in claim 9 wherein said plurality of misters comprises a plurality of rows and wherein each of said rows comprises a plurality of individual misters linked by a water supply pipeline and wherein each of said rows is linked by a water supply pipeline.

11. The trailer as recited in claim 10 wherein each of said rows may be selectively manipulated to restrict the flow of water thereto.

12. The trailer as recited in claim 9 wherein said power generation means comprises an internal combustion motor driving an associated electrical generator and further comprising control means associated therewith to selectively route generated electrical power to said fans and said means for selectively supplying and routing water.

13. The trailer as recited in claim 9 wherein said wheeled carriage comprises a hollow parallelepiped housing with substantially impermeable top and spaced apart bottom and spaced apart ends with substantially permeable spaced apart sides.

14. The trailer as recited in claim 13 wherein each of said substantially permeable sides includes a framework of internal reinforcing members.

15. The trailer as recited in claim 14 wherein said plurality of misters are secured to said framework along one of said substantially permeable sides and said plurality of fans is secured to said framework along the other of said substantially permeable sides.

16. A mobile cooling apparatus adapted to cool an area proximate thereto, said apparatus comprising:

means for producing an airborne mist proximate one side of said apparatus;

a mixing chamber associated with said apparatus and proximate said misting means; and, means for combining said airborne mist with a large quantity of turbulent air in said mixing chamber to create a suspension in said mixing chamber and subsequently transferring said suspension from said mixing chamber to the area proximate said apparatus to thereby cool the area.

17. The apparatus as recited in claim 16 wherein said apparatus comprises a wheeled trailer adapted to support said means for producing, said mixing chamber, and said means for combining.

18. The apparatus as recited in claim 17 wherein said area to be cooled is populated by a quantity of objects to be cooled.

19. The apparatus as recited in claim 18 wherein said objects to be cooled do not perspire and wherein said suspension provides a heat transfer medium adapted to evaporatively cool the objects internally and externally.

20. The apparatus as recited in claim 17 wherein said means for producing comprises a plurality of emitters linked together to form a network and said network is supplied by a high pressure pump with an associated water supply and said means for combining comprises a plurality of fans secured to said trailer oppositely from said plurality of emitters.

* * * * *